United States Patent [19]
Byerley

[11] Patent Number: 5,618,374
[45] Date of Patent: Apr. 8, 1997

[54] BELT AND TREAD DRUM FOR VEHICLE TIRE MAKING MACHINE

[75] Inventor: Mark S. Byerley, Greenback, Tenn.

[73] Assignee: WYKO, Inc., Greenback, Tenn.

[21] Appl. No.: 195,920

[22] Filed: Feb. 10, 1994

[51] Int. Cl.⁶ .................................................. B29D 30/24
[52] U.S. Cl. ........................... 156/418; 156/419; 156/420
[58] Field of Search ................................... 156/417, 418, 156/419, 420, 414

[56] References Cited

U.S. PATENT DOCUMENTS

| | | | |
|---|---|---|---|
| 3,817,812 | 5/1972 | Yabe | 156/417 |
| 4,547,251 | 10/1985 | Landsness | 156/415 |
| 5,232,542 | 8/1993 | Norjiri et al. | 156/417 |
| 5,264,068 | 11/1993 | Masuda | 156/417 |

OTHER PUBLICATIONS

Amended Declaration of Mark S. Byerley Dated Sep. 23, 1994. ; 6 pp.; 15 Exhibits.
Declaration of Mark S. Byerley Dated May 2, 1994. ; 6 pp. ; 15 Exhibits.

Primary Examiner—Michael W. Ball
Assistant Examiner—Sam Chuan Yao
Attorney, Agent, or Firm—Paul E. Hodges, P.C.

[57] ABSTRACT

A belt and tread drum for use in the manufacture of vehicle tires and having a plurality of circumference-defining segments whose radial position is determined by a camming means. The extent of movement of the camming means is selectable by stop means associated with a central shaft which serves to mount the camming means and the stop means. Visual indication of the selected circumference of the drum is provided.

11 Claims, 16 Drawing Sheets

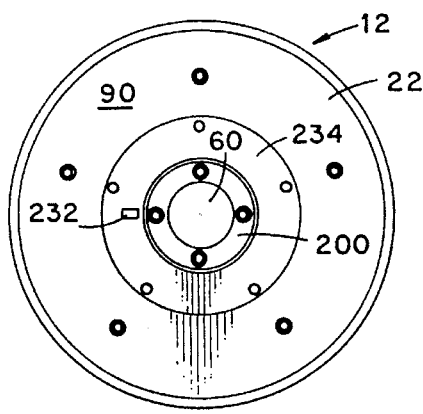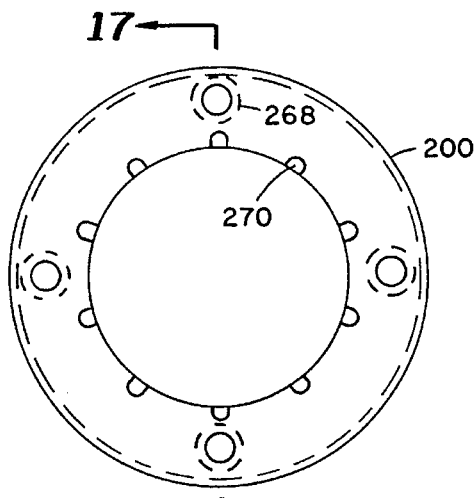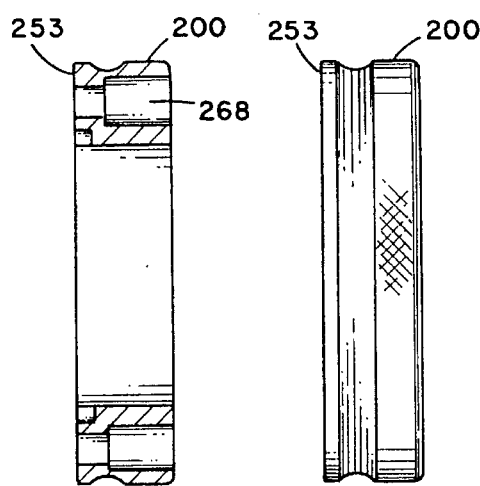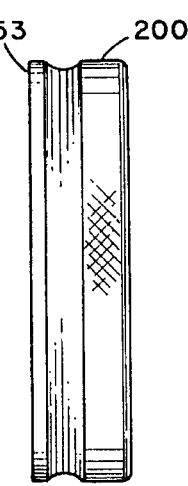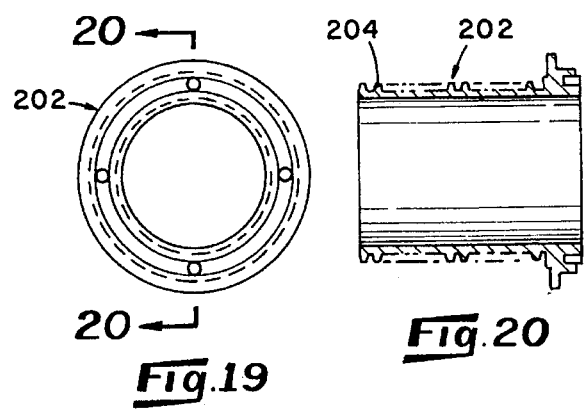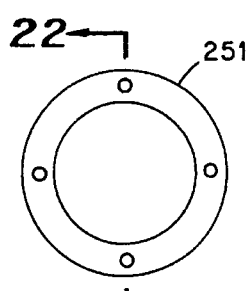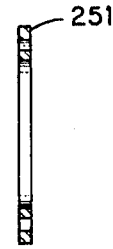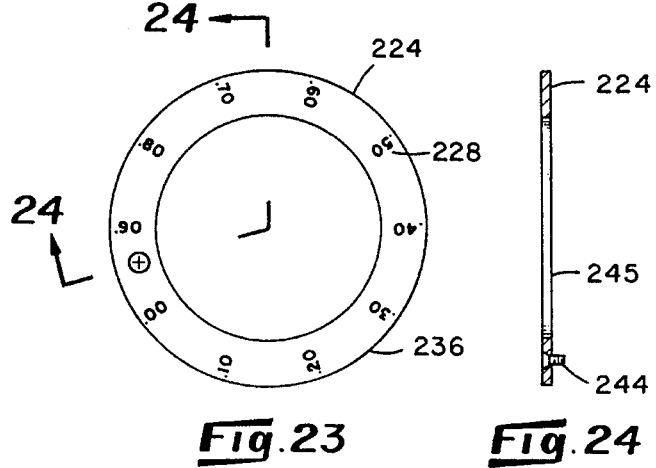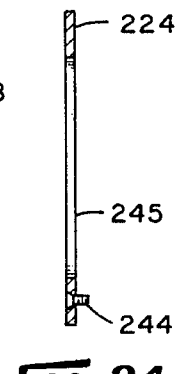

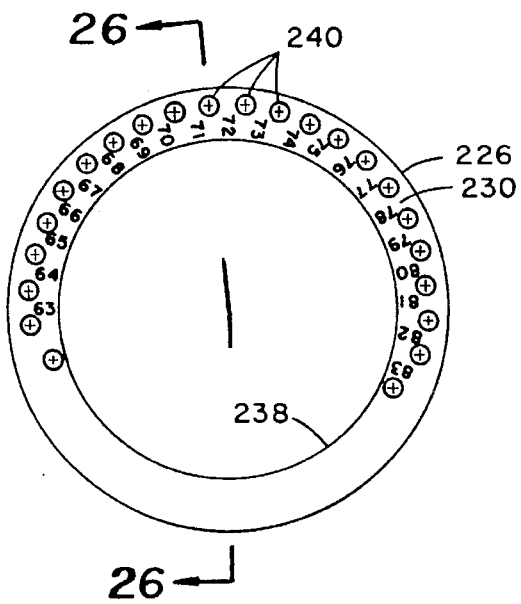
Fig.25
Fig.26
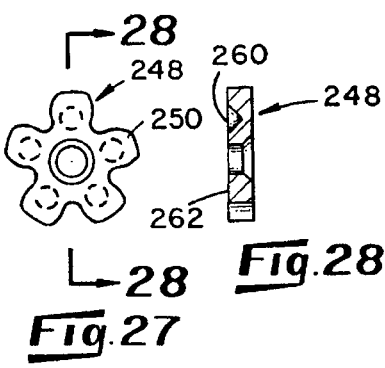
Fig.27
Fig.28
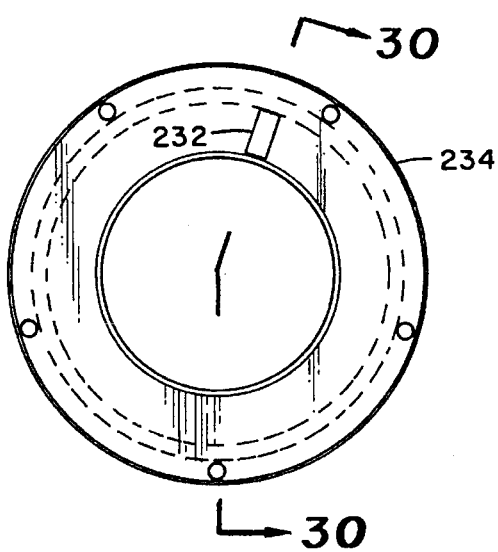
Fig.29
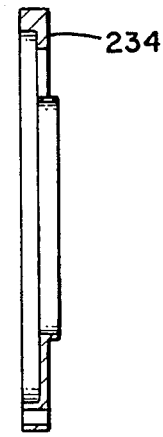
Fig.30

BELT AND TREAD DRUM FOR VEHICLE TIRE MAKING MACHINE

FIELD OF THE INVENTION

This invention relates to the field of vehicle tire making machines and, particularly to an improved belt and tread drum for use in vehicle tire making machines and having improved adjustability of the circumference thereof.

BACKGROUND OF THE INVENTION

In the manufacture of vehicle tires, the procedure commonly includes the forming of a carcass of the tire, separately forming a belt and tread portion of the tire, and thereafter marrying the belt and tread portion of the tire to the carcass to form a "green" tire. The green tire is thereafter treated to form the tread and various other features of the tire. In the course of one or more of the steps of the tire making procedure, other supplementary steps may be preformed such as stitching, etc.

In the forming of the belt and tread portion of the tire, it is common practice to lay down one or more layers of tire belt material (each layer comprising reinforcement cords embedded in a polymeric binder, for example) and then overlay one or more layers of strip tread material over the belt material layer(s). This combination of layers is referred to at times as a "package".

Formation of the package is accomplished on a belt and tread drum. This drum is rotatably mounted about its central longitudinal axis and the several layers that go to make up the package are laid onto the drum as it is rotated. The belt and tread package, by its inherent nature, is essentially nonexpandable radially. Accordingly, the inner diameter (circumference) of the package must be initially formed to precise specifications inasmuch as this inner diameter establishes the final "size" (i.e. diameter) of the tire. For these and other reasons, the outer circumference of the belt and tread drum must be established to the precise specifications for the tire being made.

Further, because the package formed on the belt and tread drum is essentially radially nonexpandable after being formed on the drum, to remove the completed package from the drum requires that the circumference of the drum be reduced to withdraw the drum from the package. Thus, in the prior art, belt and tread drums are made to be adjustable in circumference.

Among the problems of the prior art expandable belt and tread drums are those which relate to the adjustability of the circumference of the drum. Specifically, precise initial selection of the circumference of the drum to the required specifications has heretofore been less than desirable from the standpoints of ease, accuracy and speed of adjustment. Typically, in the prior art, the circumference of the drum is set approximately, measured using various external measurement devices, such as a "Pi" tape, and then reset, if necessary, to the desired circumference through mechanical adjustments to the drum. Several repetitions of this procedure may be required when setting the circumference of the drum to that circumference required for a particular tire size.

Prior art belt and tread drums typically include a plurality of segments, each of which has an outboard arcuate surface. The segments, collectively, define the outer circumference of the drum. Changing of the diameter of the drum (which term includes the concept of adjusting the circumference of the drum because diametral adjustment converts to circumferential adjustment in the device under consideration), is accomplished commonly by moving the several segments radially inwardly and outwardly of the drum to thereby decrease or increase the circumference of the drum.

It is therefore an object of the present invention to provide an adjustable belt and tread drum for use in vehicle tire making.

It is an object of the present invention to provide a belt and tread drum which is easily and readily adjustable of a wide range of vehicle tire diameters and which may be adjusted in circumference without disassembly of the drum.

It is another object of the present invention to provide a mechanism for precisely and readily adjusting the circumference of a belt and tread drum.

SUMMARY OF THE INVENTION

The present device, in a preferred embodiment, comprises a central shaft to which there are secured opposite spaced-apart end plates which are essentially parallel to one another and concentric about the central shaft which defines a rotational axis of the device. To a first end plate there is fixed the piston of a piston-cylinder arrangement. The piston is further mounted concentrically of the shaft. A cylinder which is also mounted concentrically of the shaft is movable along the length of the shaft. In its extended position, one end of the cylinder is positioned to engage a stop means which limits the extended position of the cylinder. Preferably pressurized fluid provides motive power for the movement of the cylinder relative to the fixed piston, but other sources of motive power may be used. The cylinder carries a plurality of cam means which engage cam surfaces on a plurality of segments which collectively define the circumference of the drum. These segments are slidably mounted between the end plates for radial movement of the segments. Each segment includes an arcuate-surfaced portion which is provided with alternating fingers and slots along opposite ones of their respective side edges, the fingers of one segment registering with the slots of an adjacent segment to provide a relatively continuous arcuate outer cylindrical surface to the drum.

The stop means of the present device comprises means associating the stop means with the central longitudinal shaft to which the drum is mounted for rotation, such means including position indicator means for locating the stop along the length dimension of the shaft, and providing a visual indication of the location of the stop. Further, the stop means is physically associated, through the piston means, to the position of the several cams, whose position, in turn, determines the extent of radial expansion of the several circumference-forming segments.

In a specific embodiment of the invention, the stop of the present device comprises a micrometer nut which is threadably mounted on that end of the shaft which receives the second end plate, and preferably outboard of the end plate. Housing means is provided outboard of the second end plate to cover the threaded end of the shaft and the micrometer nut. This housing means is further provided with indicia which are calibrated with the circumference of the drum. Positioning of the micrometer nut along the threaded portion of the shaft permits selection of the stop position of the extending cylinder and therefore the extent of expansion of the circumference of the drum. By these means, the operator can very precisely select the desired maximum expanded circumference of the drum by merely adjusting the position of the micrometer nut along its threaded mounting without any disassembly of the device.

In a preferred embodiment, the cam surfaces are machined to correspond to the pitch of the threaded mounting of the stop means, e.g, the micrometer nut. By this means, the angle of each of the cam surfaces is configured to correspond to the thread relationship between the drum shaft and the micrometer nut so that the diameter indicia on the housing correspond to the outer diameter of the drum. Thus, the outside diameter of the drum may be quickly and accurately changed by repositioning the micrometer nut to a new setting and then allowing the cylinder to expand to the nut.

In accordance with another aspect of the present device, a locking mechanism is provided to secure the nut in a given position. In this embodiment, the outer surface of the nut is provided with semi-circular grooves radially spaced along the outer circumference thereof. A cylindrical rod is machined or formed so as to have one flat edge along its length and is mounted so as to be parallel to the shaft for at least the length of travel of the nut. The outboard end of the rod is preferably provided with knurling to aid in rotation of the rod. The rod is preferably positioned so that the cylindrical portion of the rod will fit within the cylindrical grooves of the nut when the rod is in its normal position. This will prevent the nut from rotating and thus, lock the nut at a particular diameter setting. The rod is preferably spring loaded so that it will tend to return to such a locked position. When the rod is turned, the flat edge then aligns with the outer circumference of the nut and the nut may be rotated. Once the nut has been rotated to a new diameter, the rod is released and returns to the locked position by virtue of the spring loading mechanism.

In a further embodiment of the stop means of the present device, multiple circular dials are mounted on one end of the drum shaft. The dials are movable in response to the position of one or more knob means though which the dials are connected to a stop means disposed on the drum shaft. In this embodiment, the stop means is threadably mounted on the drum shaft so that the rotational movement of the knobs selectively changes the longitudinal position of the stop means along the length dimension of the drum shaft. In turn, as in the hereinabove described embodiment, the position of the stop means determines the extent of radial expansion of the circumference-forming segments of the drum. Through calibration, the dials provide a visual indication of the maximum expanded circumference of the drum when the cylinder contacts the stop means. This embodiment of the stop means and its positioning along the drum shaft minimizes the extent to which the drum shaft, or the stop positioning/indicating means must project beyond the outer surface of that end plate with which the means is associated, thereby minimizing the likelihood that the stop means will be damaged during the course of the tire-building operations, or that operator personnel may inadvertently strike the stop positioning/indicating means. In accordance with one aspect of this embodiment of the stop means, the multiple dials (preferably two concentric dials) are interconnected by a star operator which engages individual ones of a series of pins on each dial to provide vernier capability to the positioning of the stop.

Whereas the position of the stop is referred to in metric terms, it is to be recognized that English units of measurements may be provided, either alternatively or in addition to, the metric units of measurement. Specifically, the term "micrometer nut" is not intended to be limiting as respects the units of measurement indicated.

BRIEF DESCRIPTION OF THE DRAWINGS

The above and further features of a preferred embodiment of the present invention may be best understood with reference to the following detailed description of a preferred embodiment and the drawings in which:

FIG. 15 is an end view of the drum depicted in part in FIG. 13 and with the segmemts of the drum retracted radially to their collapsed positions of minimum drum circumference;

FIG. 16 is a plan view of an adjustment knob as employed in the stop means depicted in FIG. 13;

FIG. 17 is a sectional view of the adjustment knob of FIG. 16 and taken generally along line 17—17 of FIG. 16;

FIG. 18 is a side view of the adjustment knob depicted in FIG. 16;

FIG. 19 is a plan view of a sleeve coupler as employed in the stop means depicted in FIG. 13;

FIG. 20 is a sectional view of the sleeve coupler of FIG. 19 and taken generally along the line 20—20 of FIG. 19;

FIG. 21 is a plan view of a friction ring as employed in the stop means depicted in FIG. 13;

FIG. 22 is a sectional view of the friction ring of FIG. 21 and taken generally along the line 22—22 of FIG. 21;

FIG. 23 is a plan view of a first ring dial as employed in the stop means depicted in FIG. 13;

FIG. 24 is a sectional view of the ring dial of FIG. 23 and taken generally along line 24—24 of FIG. 23;

FIG. 25 is a plan view of a second ring dial as employed in the stop means depicted in FIG. 13;

FIG. 26 is a sectional view of the ring dial of FIG. 25 and taken generally along line 26—26 of FIG. 25;

FIG. 27 is a plan view of a star gear as employed in the stop means depicted in FIG. 13;

FIG. 28 is a sectional view of the star gear of FIG. 27 and taken generally along the line 28—28 of FIG. 27;

FIG. 29 is a plan view of a housing as employed in the stop means depicted in FIG. 13;

FIG. 30 is a sectional view of the housing of FIG. 29 and taken generally along the line 30—30 of FIG. 29;

DETAILED DESCRIPTION OF A PREFERRED EMBODIMENT

Figure 1:
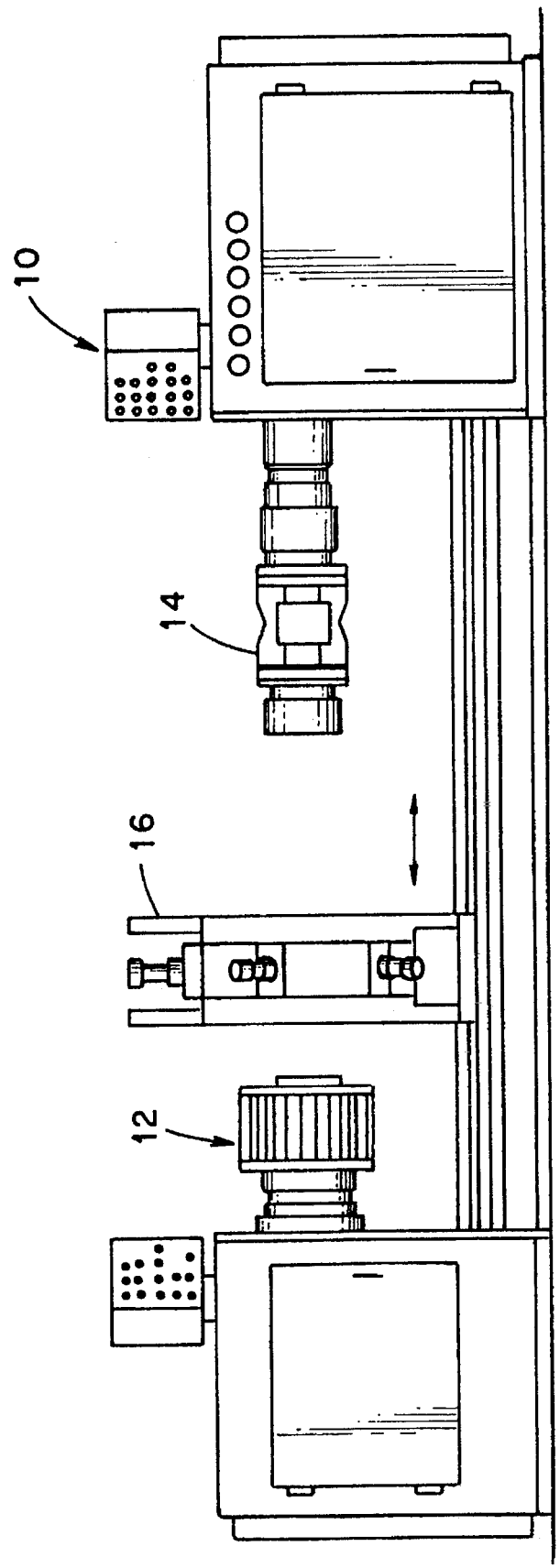
FIG. 1 is a side view of a tire making machine incorporating a improved belt and tread drum in accordance with the present invention.

Referring now to the FIGURES in which like reference numerals indicate like or corresponding features, there is shown in FIG. 1 a tire building machine 10 incorporating the improved belt and tread drum 12 which is the subject of the present invention. Vehicle tire making generally takes place in stages. In a first stage the carcass of the tire is formed. This carcass comprises a sheet of polymeric material having embedded reinforcement cords and formed around two bead wires to form the flexible inner carcass of the tire. The second stage of the tire building process consists of the forming of a belt and tread package on a belt and tread drum 12. The carcass from the first stage is transferred to an expander drum 14 which contacts the beads of the carcass to form an airtight seal and inflates the carcass so that the outer diameter of the tire carcass is slightly less than the inner diameter of the belt and tread package of the tire. Once the first stage carcass is placed on the expander drum 14, a transfer ring 16 is placed around the belt and tread package and the belt and tread drum 12 is collapsed so that the belt and tread package is supported by the transfer ring 16. The transfer ring then transfers the belt and tread package to the expander drum 14 and positions the belt and tread package around the outside of the partially inflated carcass which is already in position on the expander 14. The carcass is then further inflated to contact the inside of the belt and tread package and the belt and tread package is married to the carcass.

With reference to the construction of the belt and tread package itself, the belt and tread drum 12 needs to be capable of expanding to various diameters to correspond to the desired diameter of the tire. When tires of various sizes need to be made on a given drum, the diameter of the belt and tread drum must be adjusted for the various tire sizes. Additionally, the belt and tread drum must be quickly expandable and quickly collapsible to provide for rapid cycling of the process of marrying a belt and tread package with a carcass.

As background, the belt and tread package of the tire is formed by placing the end of a first strip of tire belt material on the belt and tread drum; the strip is supplied by a servicer (not shown), the construction and operation of which is well known in the tire building art. The belt and tread drum is then rotated one full revolution and the second end of the strip of belt material is mated to the first end. Typically, the belt and tread drum is then rotated one half revolution and a second strip of belt material is placed over the first strip, and the belt and tread drum then rotated a full revolution and the ends of the second strip of belt material are abutted to form a second ply. Finally, a strip of tread material is provided by the servicer and the first end of it is placed on the outer layer of belt material, and the belt and tread drum rotated a third time for one revolution and the ends of the tread material are abutted. Thus, the typical belt and tread package of the tire may be formed. As was discussed previously, the belt and tread drum is then collapsed and the belt and tread package is moved to the next stage of the tire building process by a transfer ring.

With reference to FIGS. 2–10, there is depicted a preferred embodiment of a belt and tread drum 12 in accordance with the present invention, the bead and tread drum 12 being generally of cylindrical geometry. The depicted drum 12 includes first and second flat disc-shaped end plates 20 and 22, respectively, and a central body portion indicated generally by the numeral 24 and which is disposed between the end plates 20 and 22. This body portion is made up of a plurality of relatively movable components, the sum of whose movements results in controlled and measured change in the outer circumference of the body portion 24 to accommodate the manufacture of tires of various sizes (i.e. tires of different diameters). Selection and control over the maximum circumference of the drum is provided for externally of the drum by means of a micrometer nut circumference-setting adjustment mechanism indicated generally by the numeral 26.

Figure 2:
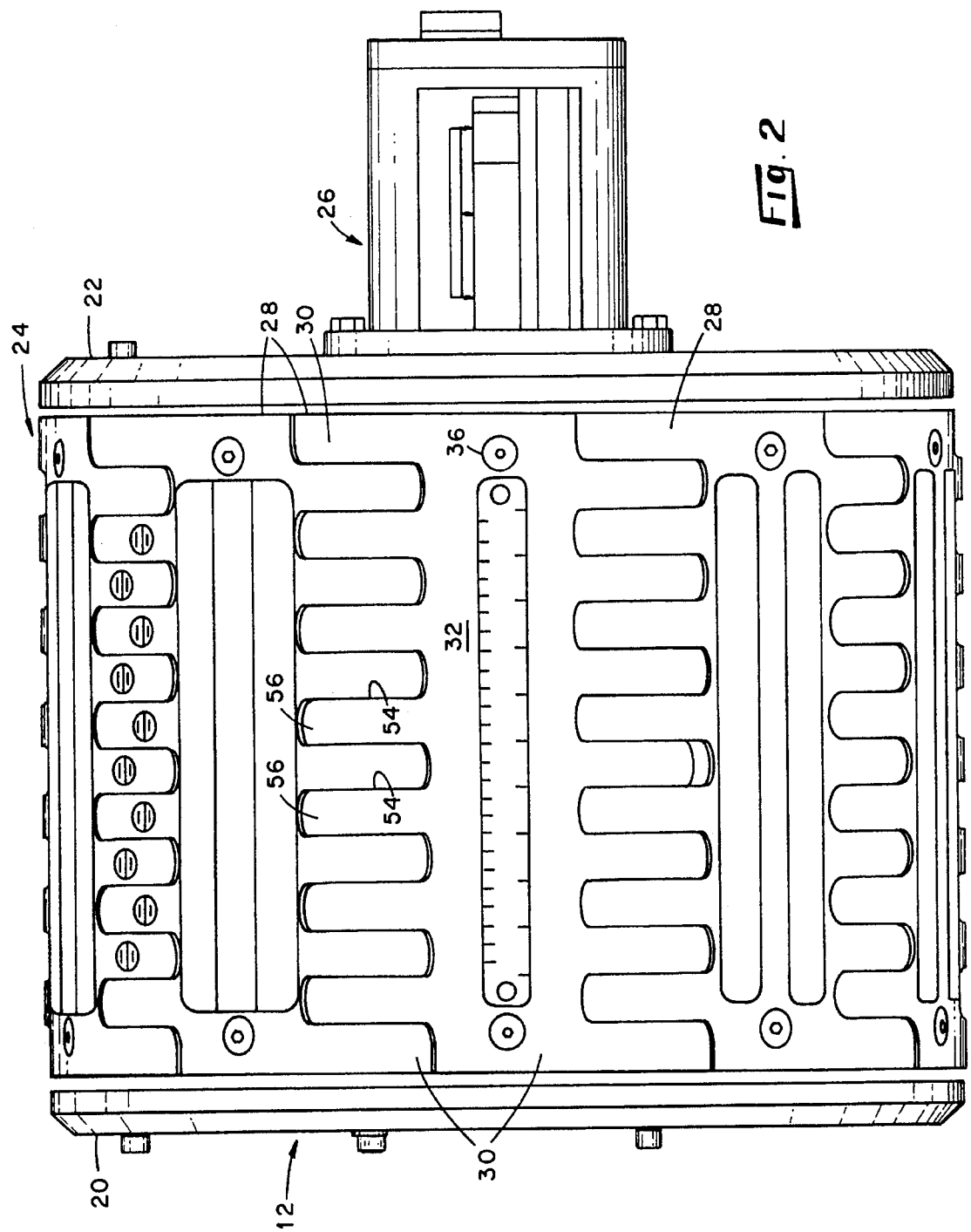
FIG. 2 is a side view of a belt and tread drum in accordance with the present invention and depicting the circumference of the drum in its condition of minimum circumference.
Figure 3:
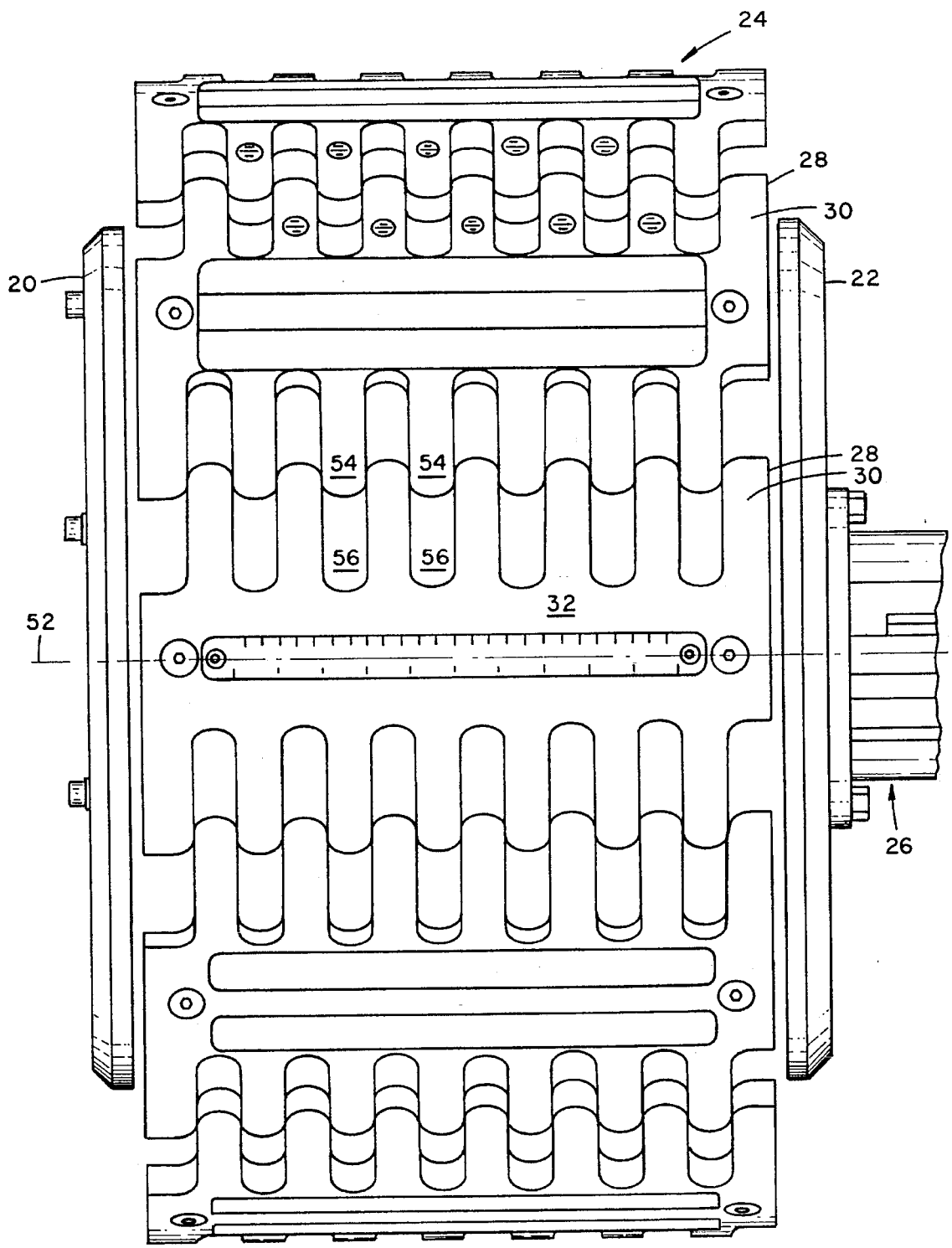
FIG. 3 is a further side view of a belt and tread drum in accordance with the present invention and depicting the circumference of the drum in a condition of maximum expanded circumference.
Figure 7:
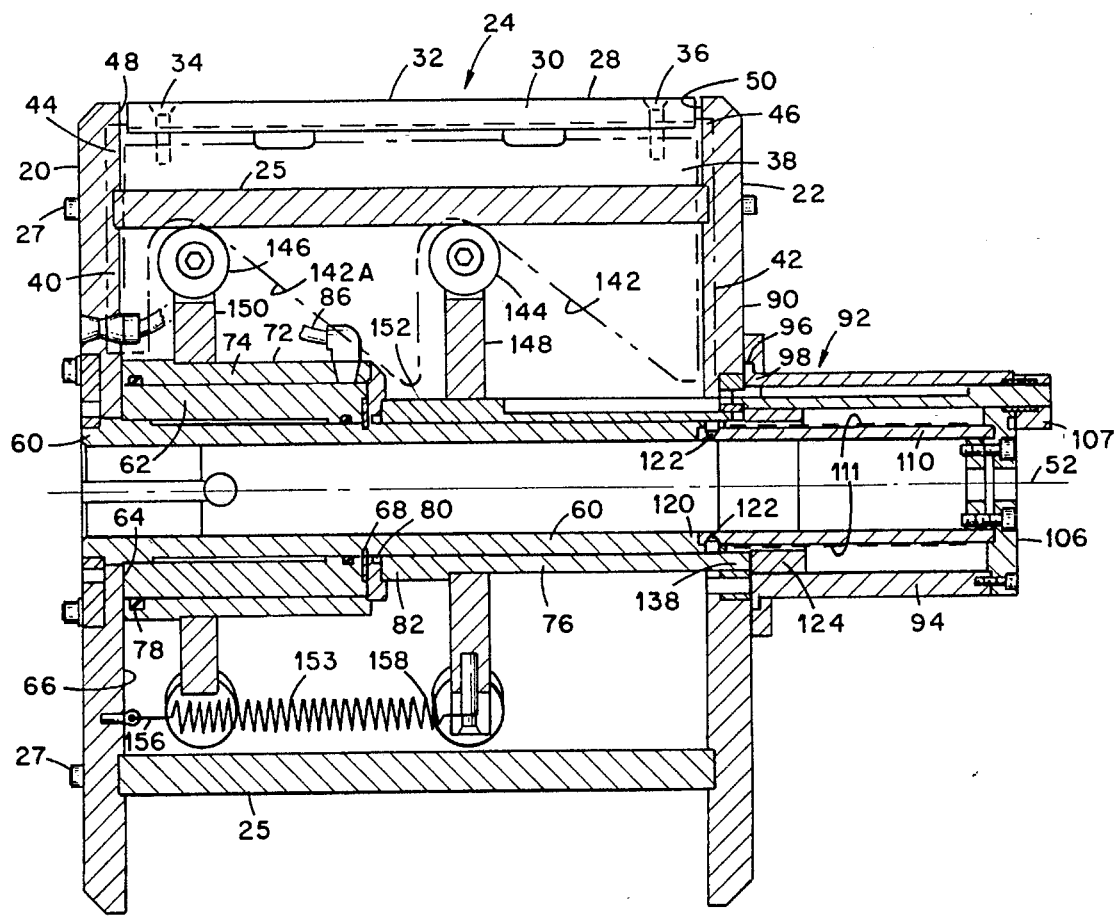
FIG. 7 is a side sectional view of the belt and tread drum depicted in FIGS. 2 and 8 and taken generally along the line 7—7 of FIG. 8.
Figure 8:
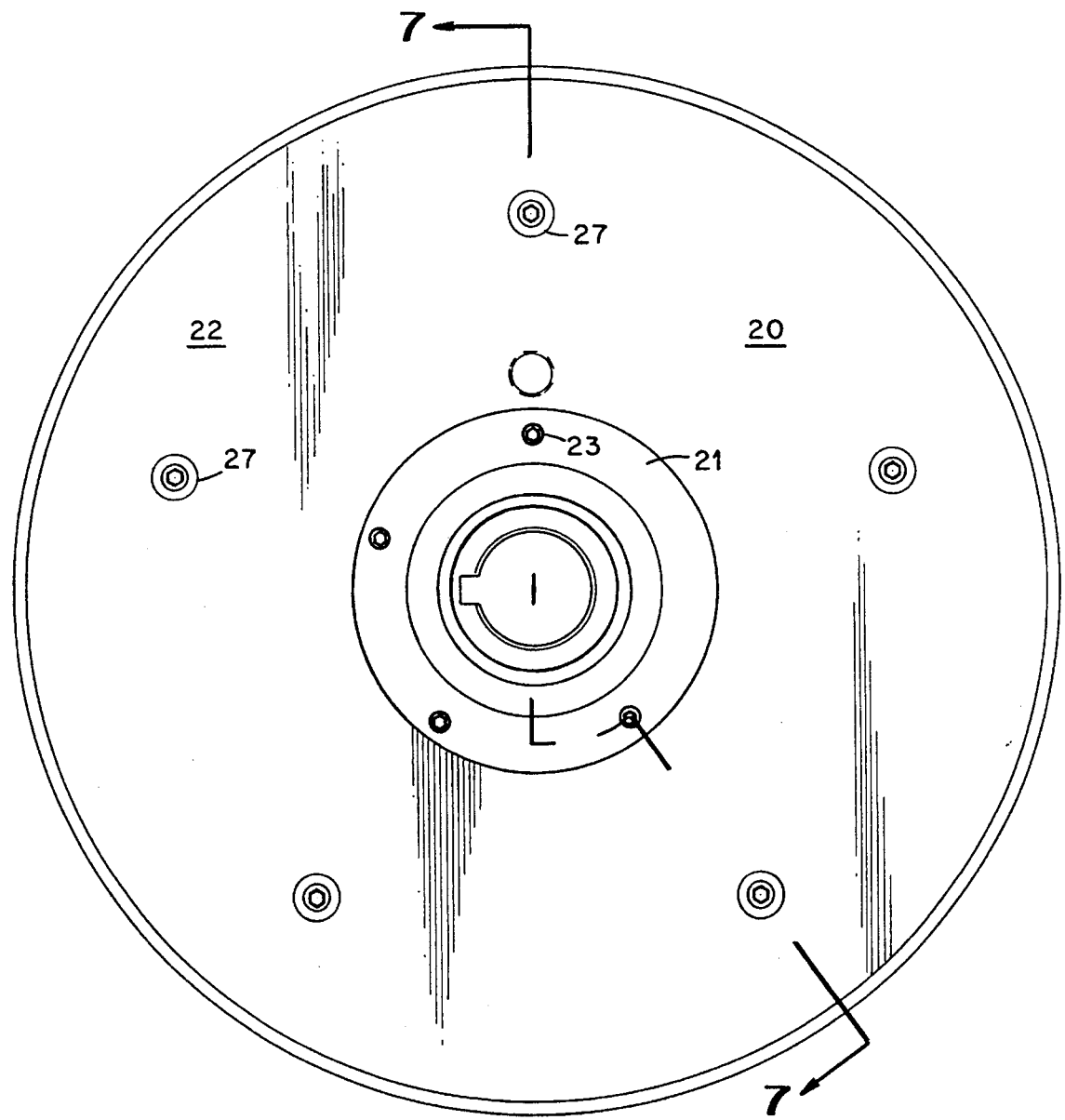
FIG. 8 is an end view of the left hand end of the belt and tread drum of FIGS. 2 and 7 and depicting various of the features of the invention.
Figure 9:
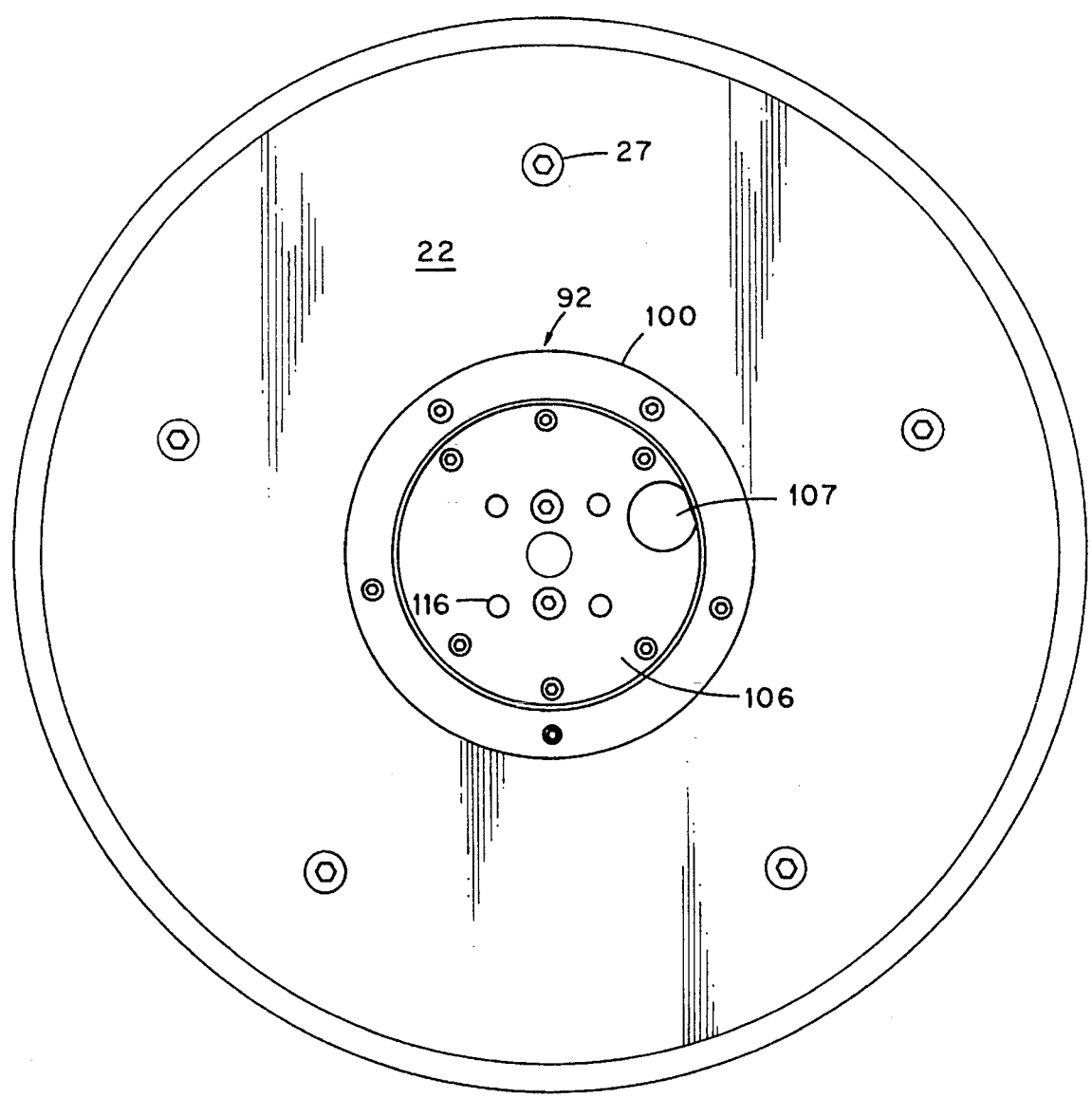
FIG. 9 is an end view of the right hand end of the belt and tread drum of FIGS. 2 and 7 and depicting various of the features of the invention.

More specifically, as depicted in FIG. 7, the body portion 24 of the present belt and tread drum 12 includes a plurality of circumference-defining segments 28, each of which comprises an outer surface element 30 (see FIGS. 2 and 5 also) whose outer arcuate surface 32 defines a segment of the circumference of the drum. The outer surface element 30 is joined as by bolt means 34 and 36 to a planar cam element 38, such cam element including opposite side ends 40 and 42 (shown partly in phantom in FIGS. 7 and 10) which are slidably received in respective slots 44 and 46 provided in the inner surfaces 48 and 50 of each of the opposite end plates 20 and 22. By means of this mounting of the cam element, it is radially movable with respect to the longitudinal centerline 52 of the drum. As depicted, there are provided a plurality of these circumference-defining segments disposed about the circumference of the drum, the cumulative effect of which is to define the overall outer circumference of the drum. As best seen in FIGS. 2 and 3, each of the outer surface elements 30 of each of the segments 28 is provided with a plurality of slots 54 in each of the opposite longitudinal side margins of the outer surface element, these slots defining therebetween alternating fingers 56 that are designed to be received within the slots 54 of the outer surface elements of adjacent ones of the segments 28. In FIG. 2, the several segments are depicted with the fingers of each of outer surface elements of the segments being fully received within respective mating slots of adjacent segments. In this position of the segments, the circumference of the drum is at its minimum value. In FIG. 3, the drum is depicted at its maximum expanded circumference and with the fingers of the several outer surface elements being withdrawn (partially) from the slots of respective adjacent segments.

For purposes of clarity of understanding, it is to be noted that various of the components of the present invention are not repeated in the Figures. For example, in FIGS. 4 and 7, the segments 28 and associated elements are not repeated in the lower half of these Figures.

The depicted drum 12 includes a central shaft 60 which is of tubular geometry in the depicted embodiment. Each of the end plates 20 and 22 is centrally bored and fitted onto the shaft to fixedly mount the end plates at spaced-apart locations on the shaft 60, in parallel relationship to one another and perpendicular to the longitudinal centerline (rotational axis) 52 of the shaft, hence to the longitudinal centerline of the drum. In the depicted embodiment, (see FIGS. 4, 5 and 6), the end plate 20 is secured to the shaft 60 by means of a locking flange 21, which, in turn, is secured to the plate 20 by bolts 23. The end plates 20 and 22 are rigidly secured to one another as by a plurality of rigid rods 25 which extend between the plates 20 and 22 and whose ends are secured to the plates as by bolts 27. The shaft 60 further serves as the means for rotatably mounting the drum on the tire-making machine.

There is further mounted on the shaft 60 a cylindrical piston 62. This piston is fixed on the shaft with one end 64 of the piston engaging the inner surface 66 of the end plate 20 and secured against longitudinal movement away from the end plate as by means of a snap lock ring 68 encircling the shaft 60 at a location adjacent the opposite end 70 of the piston.

Cylinder means 72 comprises a first cylindrical section 74 which is disposed in sliding relationship to the fixed piston 62 and a second cylindrical section 76 which is disposed in sliding relationship about the shaft 60. Seal means 78 provided adjacent the end 64 of the piston and between the piston and the encompassing first section 74 of the cylinder means, provides for pressure sealing of the space between the piston and first section of the cylinder. Similar seal means 80 is provided between one end 82 of the second section 76 of the cylinder and the shaft 60 to provide pressure sealing between the second cylinder section 76 and the shaft 60. Pressurized fluid from a source (not shown) is introduced into the space 84 (FIG. 4) between the piston, the shaft and the first section 74 of the cylinder 72 via a conduit 86 that leads through the thickness of the end plate 20, thence through a fitting 88 to the interior of the space 84.

Figure 4:
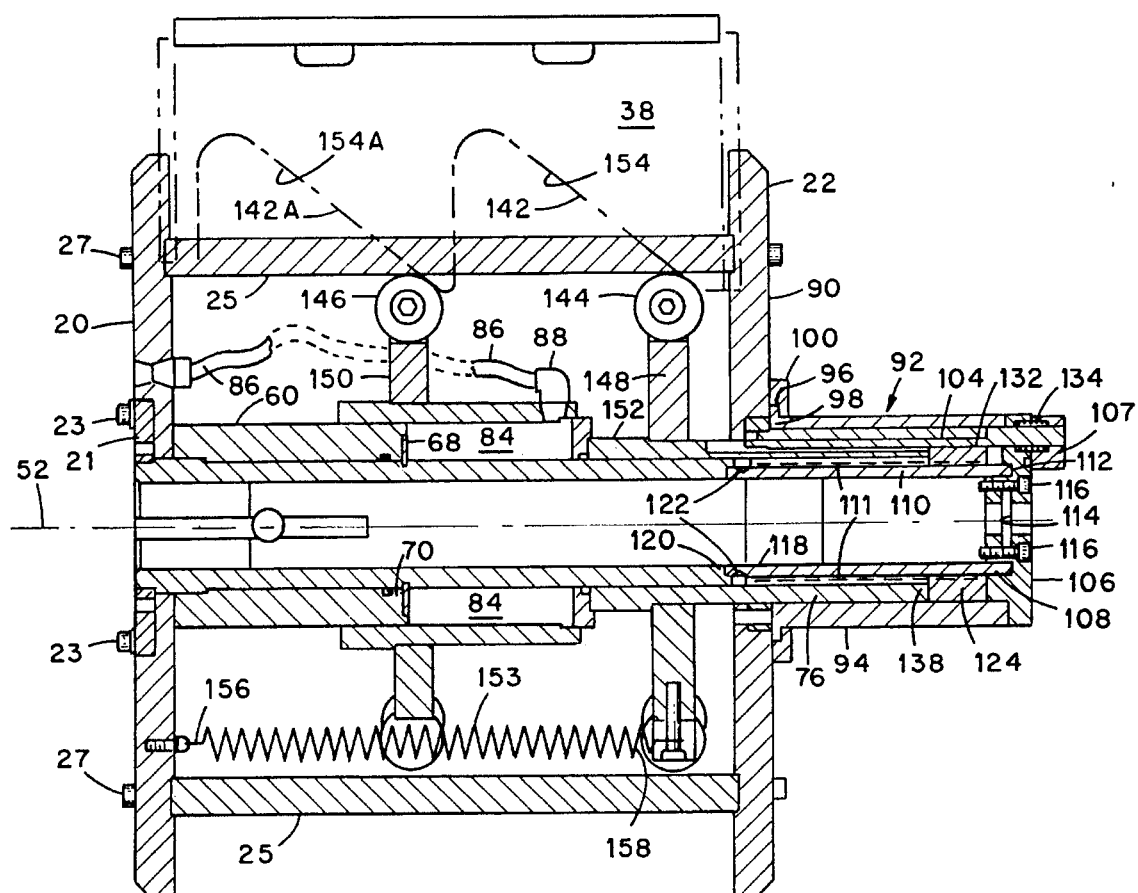
FIG. 4 is a side sectional view of the belt and tread drum depicted in FIGS. 3 and 5 and taken generally along the line 4—4 of FIG. 5, showing the circumference of the drum in an expanded condition, and depicting various features of the invention.
Figure 11:
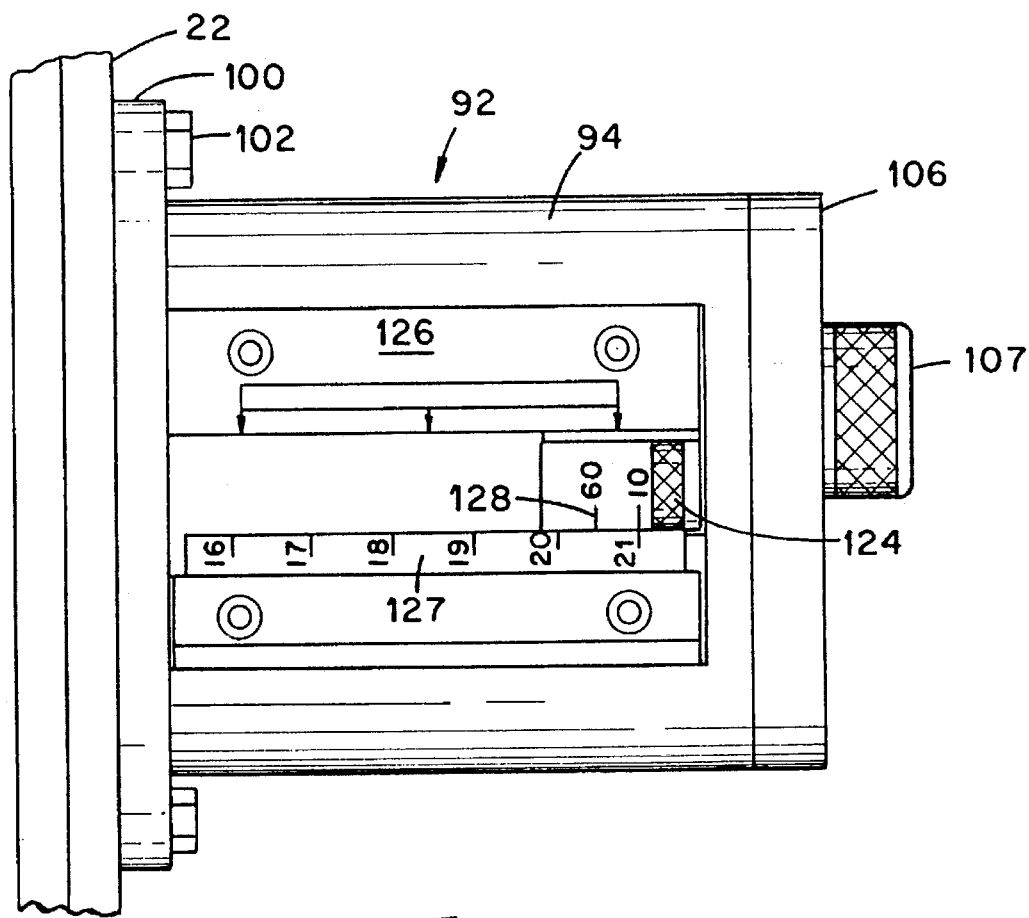
FIG. 11 is a side view of a micrometer nut circumference-setting adjustment mechanism for the belt and tread drum of the present invention.

As depicted in FIGS. 4 and 7, the outer surface 90 of the end plate 22 has affixed thereto a micrometer nut circumference-setting adjustment mechanism 92. This mechanism includes a cylindrical housing 94 that is mounted to the end plate 22. In the depicted embodiment, the cylindrical housing is provided with a circumferential flange 96 on one end 98 thereof. A retaining flange ring 100 is fitted over the housing and engages the flange 96 on the housing. The flange ring, in turn, is affixed to the end plate 22 as by bolt means 102 (see FIG. 6) to secure the housing to the end plate. Within the housing 94 there is provided an assembly, indicated generally by the numeral 104, which includes an end cap 106 which closes the outermost end 108 of the cylindrical housing 94. Further the assembly includes a cylindrical barrel 110 having external threads 111 thereon and one end 112 of which is mounted to the inner surface 114 of the end cap 106 as by bolts 116, and the opposite end 118 of which is anchored to the end 120 of the shaft 60 as by means of set screws 122. By this means, the barrel is fixedly positioned with respect to the shaft 60 and the end plate 22. Micrometer nut means 124 (FIG. 7), which is internally threaded, is threadably received on the barrel 110. As best seen in FIG. 11, the housing 94 is provided with a window 126 through which graduations 128 provided on the micrometer nut 124 are visible, and through which assess is gained to the micrometer nut for movement of the nut to a selected position along the longitudinal length of the barrel 110. As depicted in FIG. 11, at least one of the longitudinal side edges 127 of the window 126 is provided with indicia which, in cooperation with the graduations on the micrometer nut, serve to permit selection of the position of the micrometer nut along the length of the barrel 110, hence to establish a stop which limits movement of the cylinder means 72 in a direction away from the piston 62, and thereby establish the maximum circumference of the drum.

Figure 12A:
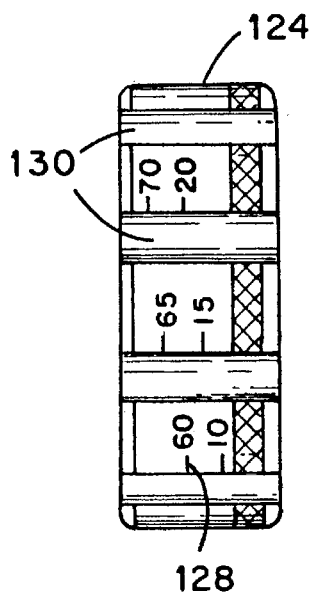
FIG. 12A depicts a micrometer scale which is a part of the circumference-setting adjustment mechanism of FIG. 11.
Figure 12B:
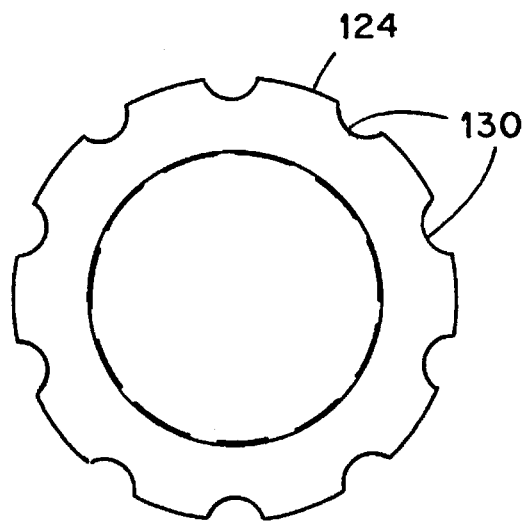
FIG. 12B depicts a micrometer nut employed in the circumference-setting adjustment mechanism of FIG. 11.

Referring to FIGS. 12A and 12B, the micrometer nut 124 is provided with precisely spaced-apart hemispherical indentations 130 about the outer circumference of the nut. As depicted in FIG. 4, a spring-loaded locking pin 132 of "D" shape cross section, is mounted in the end cap 106 and extends parallel to the length of the threaded barrel 110 to provide a means for releasably locking the micrometer nut in any of the selected positions of the nut along the length of the barrel 110. One end of the pin 132 projects through the end cap 106 and receives thereon a knurled knob 107 which may be grasped to rotate the pin 132 and thereby lock and unlock the micrometer nut from rotation about the threaded barrel 110. Torsion spring means 134 provides for the desired loading of the locking pin toward a locking position.

Referring again to FIGS. 4 and 7, one end 138 of the second section 76 of the cylinder 72 is disposed for engaging the micrometer nut 124 upon movement of the cylinder 72 in a direction away from the fixed piston 62. By this means, the movement of the cylinder in a direction toward the nut 124 is halted when the end 138 of the cylinder 72 contacts the nut 124. Thus, the position of the nut 124 along the barrel 110 determines the extent to which the cylinder 72 can be moved away from the piston 62. As will be seen hereinafter, the sliding movement of the cylinder 72 along the central shaft 60 in a direction away from the piston serves to urge the plurality of circumference-defining segments 28 radially outward from the longitudinal centerline of the shaft in a manner which expands the effective circumference of the drum.

Any of several possible combinations of thread pitch for the threads 111 of the threaded outer circumference of the barrel 110, and for the circumferential spacing of the indentations 130 in the micrometer nut 124 are acceptable. In a preferred embodiment, these variables are chosen to provide 5 millimeters incremental spacing of the indentations on the nut with thousand and hundred millimeters increments on the stationary scale (indicia) of the window to thereby set the drum circumference in millimeters.

Figure 5:
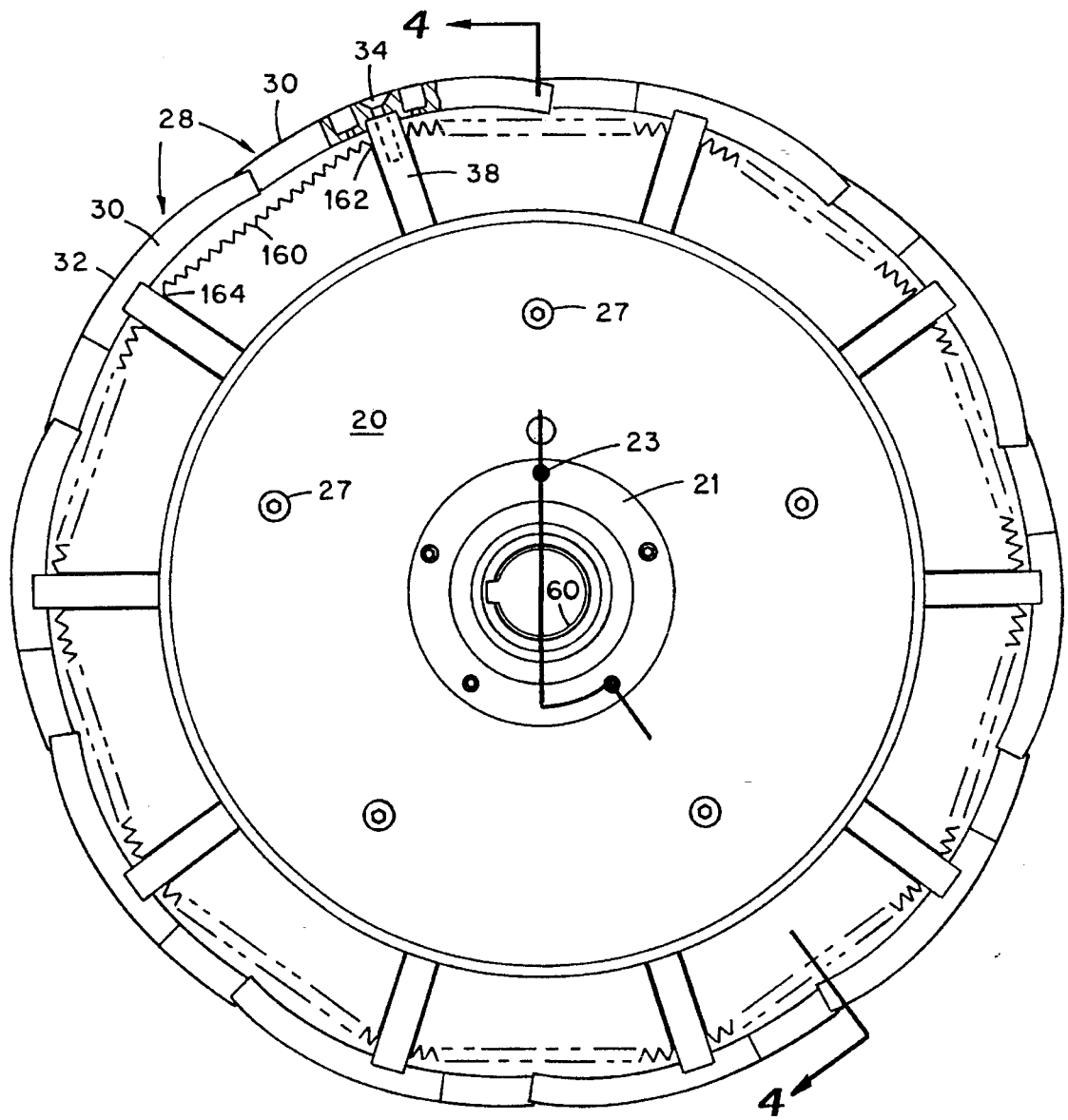
FIG. 5 is a reduced scale end view of the left hand end of the belt and tread drum of FIGS. 3 and 4 and depicting various of the features of the invention.
Figure 6:
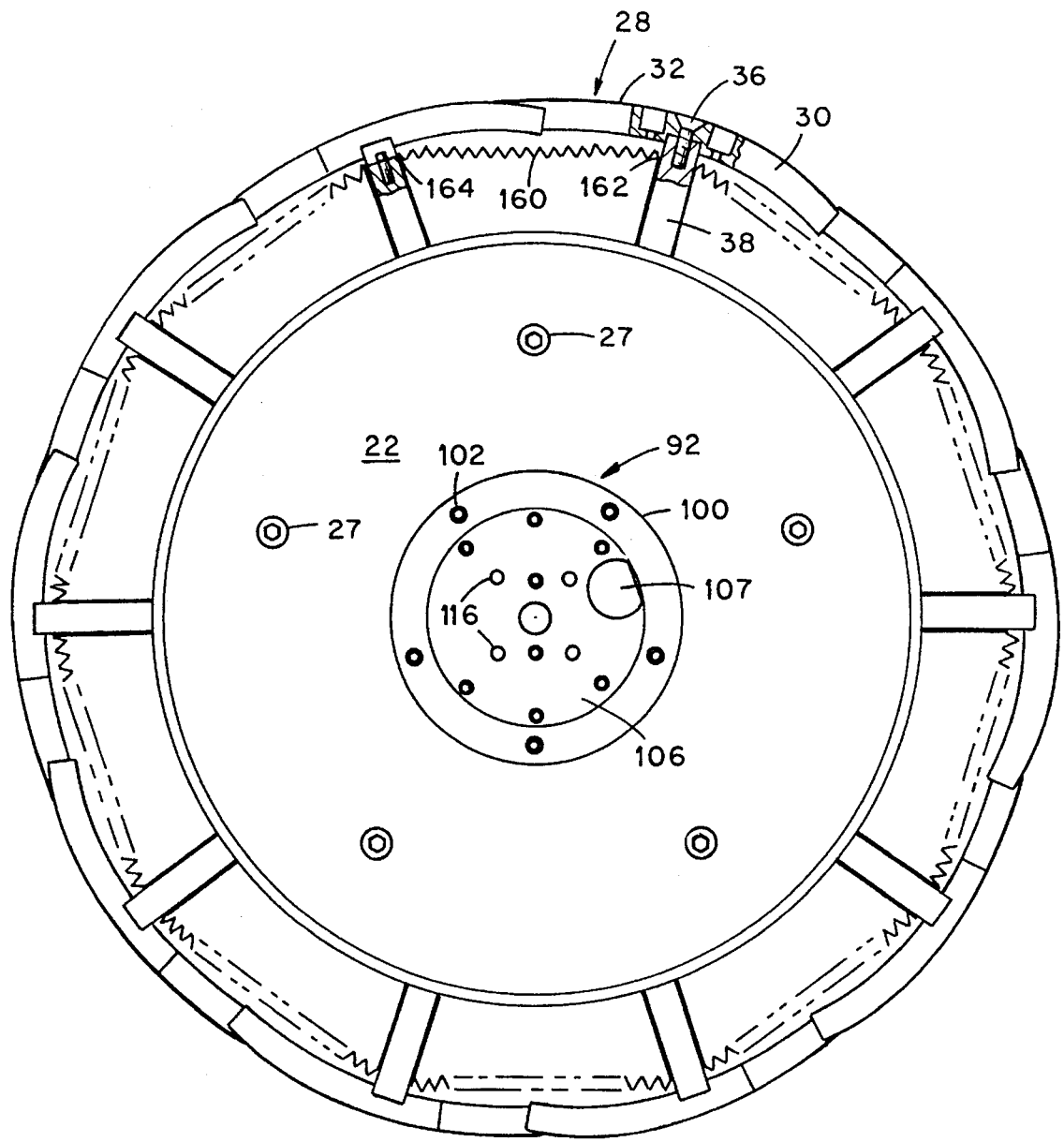
FIG. 6 is a reduced scale end view of the right hand end of the belt and tread drum of FIGS. 3 and 4 and depicting various of the features of the invention.
Figure 10:
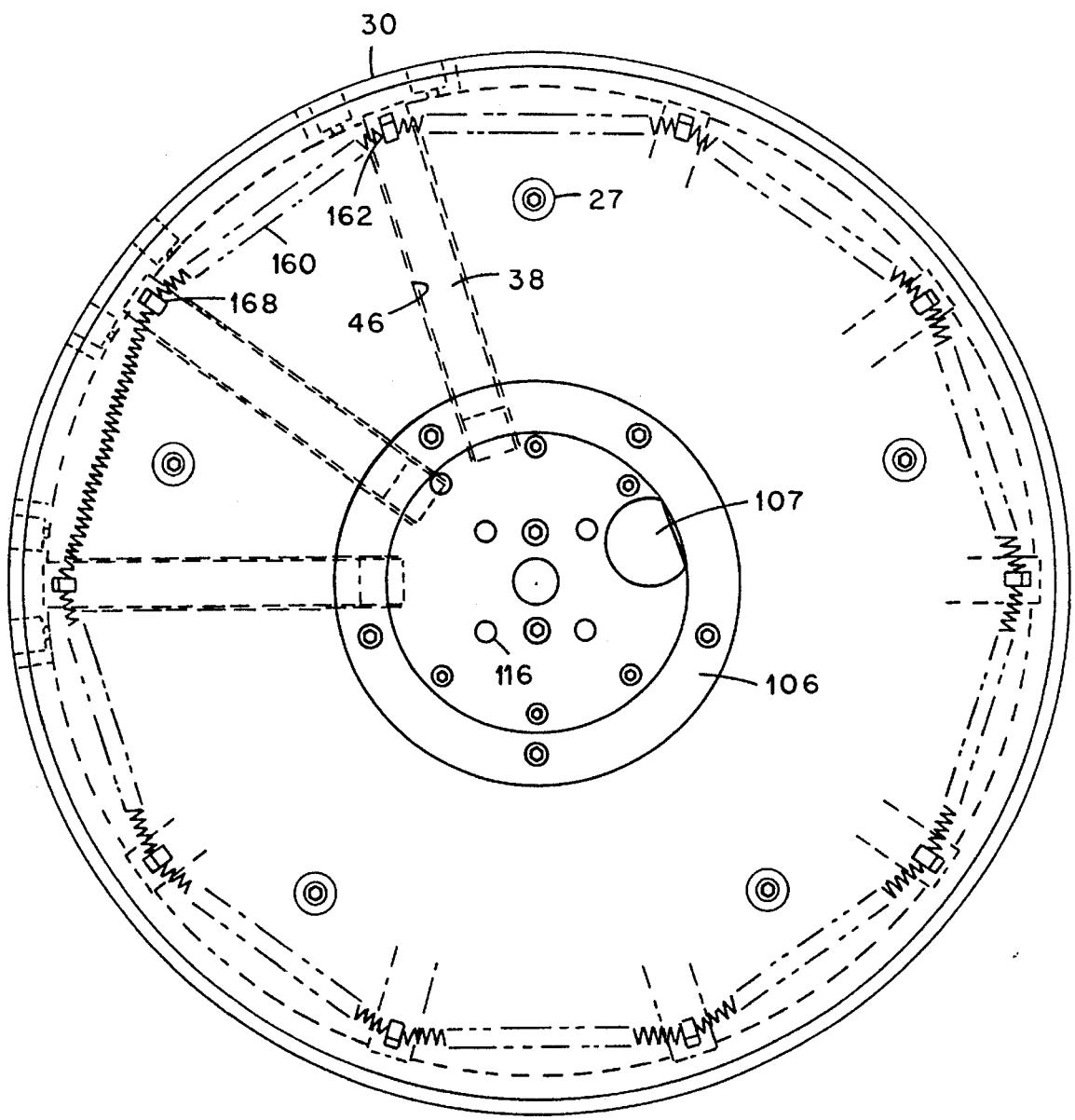
FIG. 10 is an end view of the right hand end of the belt and tread drum of FIGS. 2 and 7 and including various of the features of the invention depicted in phantom.

Still referring to FIGS. 4 and 7, the innermost surface of each of the planar cam elements 38 is contoured to provide at least one cam surface 142. Preferably two or more identical cam surfaces 142 and 142A are provided on each cam element. Roller cams 144 and 146 mounted on supports 148 and 150, respectively, which are fixedly secured to the outer surface 152 of the cylinder 72 and which are movable with the cylinder 72, are provided in camming engagement with respective cam surfaces 142 and 142A (typical) on the cam element 38. As depicted in FIGS. 2,4,5, and 7, each cam element 38 is identically mounted in radially slidable relationship between the end plates 20 and 22. Further each cam element is identical to the described cam element 38, has identical cam surfaces, and is actuated radially outwardly by the action of identical roller cams. With further reference to FIG. 4, one of the supports 148 for example, of each set of supports 146 and 148, is connected by a spring means 153 to the end plate 20. As may be seen by comparing FIGS. 4 and 7, movement of the cylinder 72 in a direction away from the fixed piston 62 moves the roller cams carried by the cylinder in a direction toward the end plate 22. Each of the cam surfaces 142 and 142A includes an inclined portion 154 and 154A, respectively, such that when the roller cams are moved toward the end plate 22, the cams, acting against the cam surfaces 142 and 142A, urge the respective circumference defining segment 28 radially outward from the centerline of the drum. This action results in enlargement of the effective circumference of the drum, as best seen in FIG. 3. Contrariwise, movement of the cylinder 62 in a direction away from the end plate 22 permits the segment 28 to return radially toward the centerline 52 of the drum. This return movement of the cylinder 72 is effected, in the depicted embodiment, by the spring means 153, one end 156 of which is anchored to the inner surface of the end plate 20 and the opposite end 158 of which is secured to one of the cam roller supports that is mounted on the cylinder 62. As required, a plurality of these return springs 153 is provided in spaced-apart locations around the shaft 60 to accommodate each of the plurality of cam elements 38. As depicted in FIGS. 4, 5 and 10, springs 160 are provided between adjacent cam elements 38, the opposite ends 162 and 164 of each spring being anchored to the adjacent cam elements such that radially outward movement of the cam elements and their associated arcuate segment 28, effected by the movement of the cylinder 72 toward the nut retraction of the cylinder 72 under the influence of the springs 153, the springs 160 urge the cam elements and the arcuate segments radially inward toward a position of minimum drum diameter.

In a preferred embodiment, each inclined section 142 and 142A of a cam surface of a cam element is machined so that the angle of the incline corresponds to the pitch of the threads on the barrel 110 so that expansion of the drum circumference (i.e. the diametral movement of the cam element) will correspond to the readings on the circumference-setting adjustment mechanism 92. In the preferred embodiment, a correction factor is machined into each of the inclined sections 142 and 142A to correct for errors in circumference of the drum due to deviations from circularity caused by the outward movement of the several arcuate outer surface elements 30. Thus, a high degree of accuracy and correspondence between the drum circumference setting by the micrometer nut and the actual drum circumference is achieved.

The present device provides a multitude of advances over the prior art. First, with respect to adjustment, prior art belt and tread drums used a spacer arrangement wherein in a set of expensive spacers would be provided to provide stops against which a cylinder would act. Adjustment of the diameter would require disassembly of the drum while spacers for one diameter were removed and spacers of a different diameter were inserted. These spacers would essentially be provided between a stop plate and a cylinder which would allow the cylinder to expand up until the spacer edge.

Furthermore, a change in diameter of the drum beyond about an ⅛ of an inch introduced excessive error in drum diameter due to the gap between expanding drum segments. In the prior art devices, the drum segments would typically be wedged shaped elements of varying thicknesses. In the prior art devices, as the drum was expanded the gap between the wedges would increase until the gap was so great that the drum would not support the belt and tread strips in a circular cross section. The prior art remedy for this problem was to add thicker drum segments as you expanded the diameter of the tire. Of course this solution required disassembly of the drum and replacement or addition of segments to the drum. Thus when it was necessary to adjust the diameter to provide for making tires of different diameters, prior art belt and tread drums required not only disassembly of the drum to change a spacer, but also required disassembly or reassembly of the drum to provide new outer drum segments. This provided a multitude of manufacturing problems in that adjustment was not quick and easy and therefore adjustment had to be minimized or a plurality of tire making machines be provided so as to provide for the manufacture of differing tire diameters.

The present device requires no tools or disassembly of the belt and tread drum to allow for the rapid adjustment of the diameter thereof. Thus, the tire diameters may be quickly varied with the present belt and tread drum to keep pace with orders and demand and optimize manufacturing operations. The micrometer screw and nut diameter setting arrangement provides for easy diameter adjustment and the inter-locking finger/slot arrangement of the belt and tread drum segments provides for minimum distortion of the tire cross section and maximum correlation between the set diameter and the actual diameter of the drum. Furthermore, the machining of the shape of the cam surfaces to correct for cross sectional errors added by expanding the drum segments allows for even greater accuracy in the tire making process. Thus, the belt and tread drum of the present invention provides a substantial improvement over prior art belt and tread drums.

In use, various belt and tread drums may be provided. For passenger car tires, the belt and tread drum preferably has a completely collapsed diameter of about 1550 millimeters and expands to a maximum diameter of about 2110 millimeters. Of course, the drum may be easily manufactured to achieve practically any diameter range desired by simply varying the scale of the drum. In the preferred embodiment, the pitch of the threads 111 on the barrel 110 is preferably about 1 millimeter/turn; obviously other pitches could be used. Further, the preferred embodiment incorporates 20 circumference-defined segments 28 and a correspondingly appropriate number of cam surfaces 142 and 142A, roller cams 144 and 146, roller cam supports 148 and 150, and other multiple units of other components such as the return springs 153, springs 160 etc., all as will be recognized by one skilled in the art. The dimensions of the segments 28 are determined by the desired minimum drum diameter (1550 millimeters in the preferred embodiment) and the number of desired segments (20 is the preferred embodiment). The length and spacing of finger members 56 are similarly dictated by geometry considerations, but in the depicted embodiment they are about 70 millimeters long and 24 millimeters wide. The several corresponding slots 54 are appropriately dimensioned to receive therein individual ones of the fingers without binding, but with minimal spacing between the slot edges and the outer sides of the fingers. Obviously, if a greater expanded or lesser contracted drum diameter were desired, the length of the finger members could be varied accordingly. The various components are constructed of materials well known in the art, but preferably, plastic and aluminum is used wherever possible to minimize the mass of the components. This minimizes the moment of inertia of the drum to allow its more rapid movement.

Figure 13:
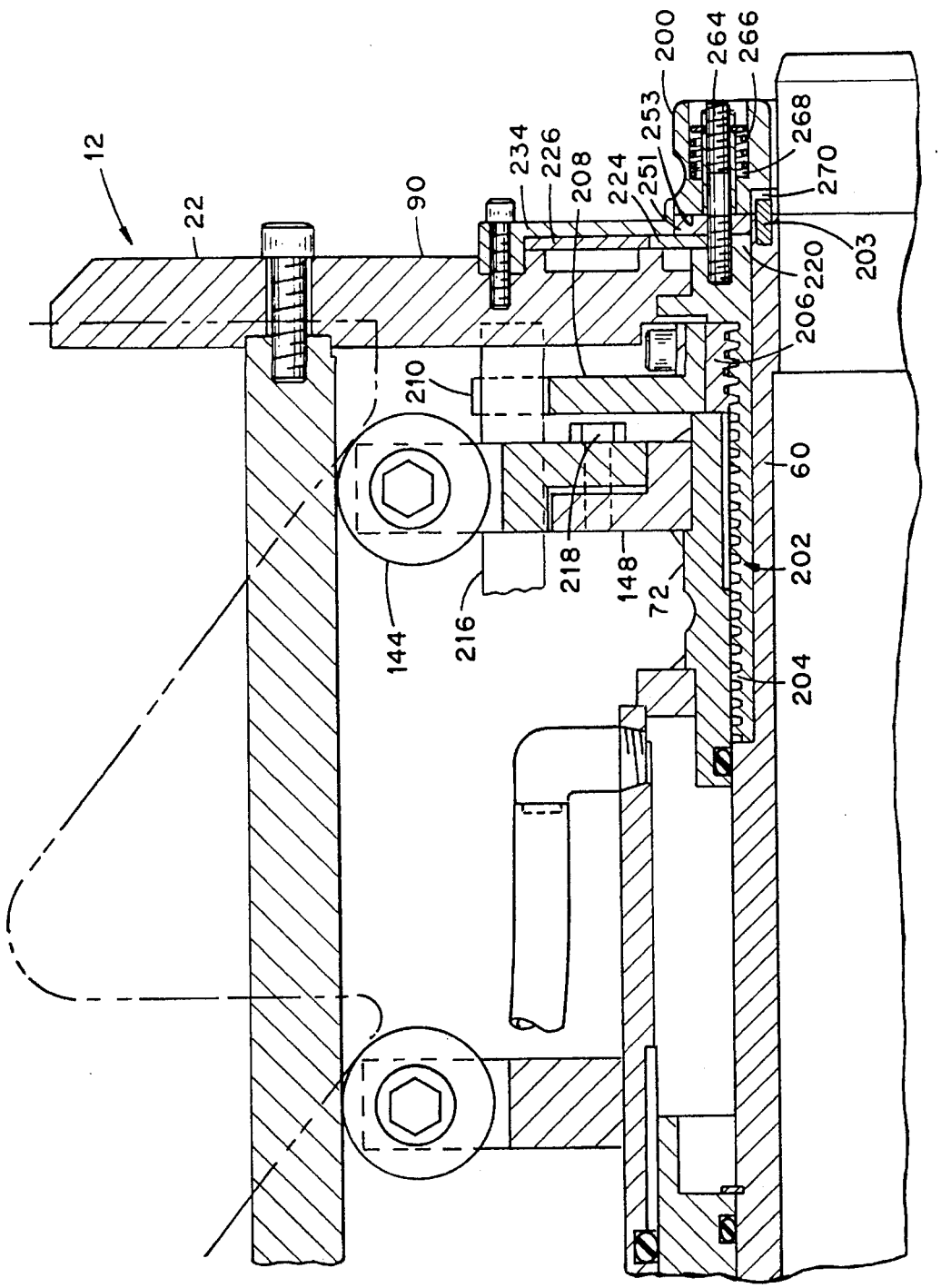
FIG. 13 is a sectional view of a portion of the right-hand end of a belt and tread drum and depicting, among other things, one embodiment of a stop means in accordance with the present invention.
Figure 31:
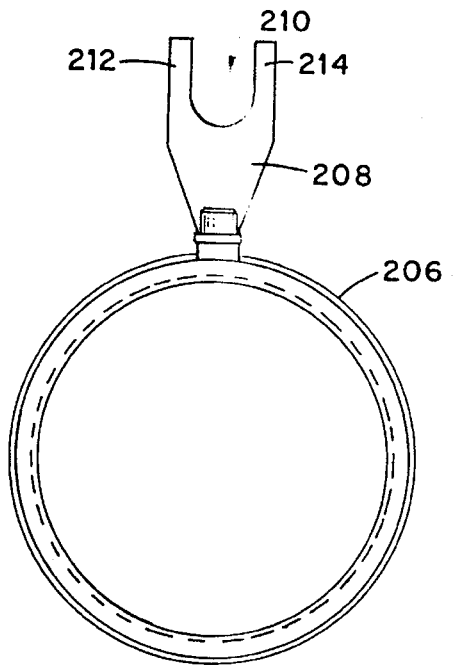
FIG. 31 is a plan view of a follower nut as employed in the stop means depicted in FIG. 13.
Figure 32:
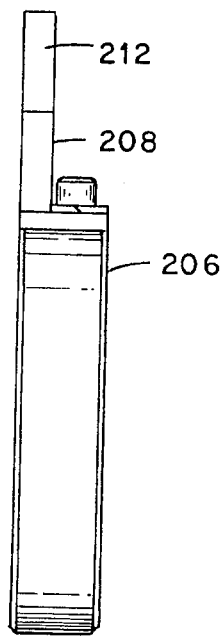
FIG. 32 is a side view of the left hand side of the follower nut of FIG. 31; and, FIG. 33 is a sectional view of a portion of the side sectional view of the belt and tread drum depicted in FIG. 7.

Referring initially to FIG. 13, a further embodiment of a stop means embodying various features of the invention includes a circular knob 200 which is mounted relatively flush with the outer surface 90 of the end plate 22 of the drum 12. This knob is coupled to a sleeve coupler 202, as by a pin 203, that is slidably received on the outer surface of the shaft 60 of the drum. The coupler is provided with external threads 204 onto which there is threadably received a circular follower nut 206 (see also FIGS. 31 and 32). This follower nut includes an arm 208 rigidly secured thereto and which projects therefrom to terminate in a yoke 210 having spaced apart legs 212 and 214. Referring again to FIG. 13, a rigid stabilizer bar 216 is provided between, and anchored to, the opposite end plates 20 and 22. The legs of the yoke 210 receive therebetween the bar 216. By this means, the bar functions as a rigid anchor means that prevents the follower nut 206 from rotating relative to the drum, while permitting the follower nut to slide longitudinally along the bar 216.

As depicted in FIG. 13, the support 148 for the roller cam follower 144 in the present embodiment includes an adjustable stop nut 218 thereon which is in facing relationship to the arm 208 of the follower nut. Referring to FIG. 7, recalling that the support for the roller cam follower 144 is rigidly mounted on the cylinder 72 and moves longitudinally along the length of the shaft 60 in response to the movement of the cylinder 72, when the stop nut 218 on the roller cam follower 144 engages the arm 208 of the follower nut 206, longitudinally outward movement of the cylinder is stopped. Thus, the arm 208 of the follower nut 206 acts as a physical stop that limits the longitudinal outwardly movement of the cylinder and the roller cam follower(s), thereby limiting the extent to which the roller cam followers will urge the segments 28 radially outwardly. By this means, the position of the follower nut 206 on the externally threaded sleeve coupler 202 limits the radial expansion of the segments of the drum, hence the outer circumference of the drum.

Inasmuch as the circular follower nut 206 is prevented from rotating with respect to the drum, hence with respect to the shaft 60 of the drum, and because the sleeve coupler is rotatable, but not slidable, upon the shaft 60, rotation of the sleeve coupler serves to reposition the circular follower nut 206 relative to the length dimension of the shaft 60 and thereby set the limit of radial expansion of the circumference of the drum.

The location of the circular follower nut 206 along the length dimension of the shaft 60 is established by the sleeve coupler 202 due to the threaded relationship of the nut and coupler. As may be seen in FIG. 13, rotation of the coupler on the shaft results in movement of the follower nut along the threaded portion of the coupler.

Rotation of the coupler 202 is effected by the circular adjustment knob 200 which is connected to the outboard end 220 of the coupler by means of at least one pin 203. Preferably there are four such pins spaced equally about the circumference of the outboard end of the coupler. Accordingly, upon rotation of the knob 200, the coupler also rotates to change the longitudinal position of the follower nut.

Figure 14:
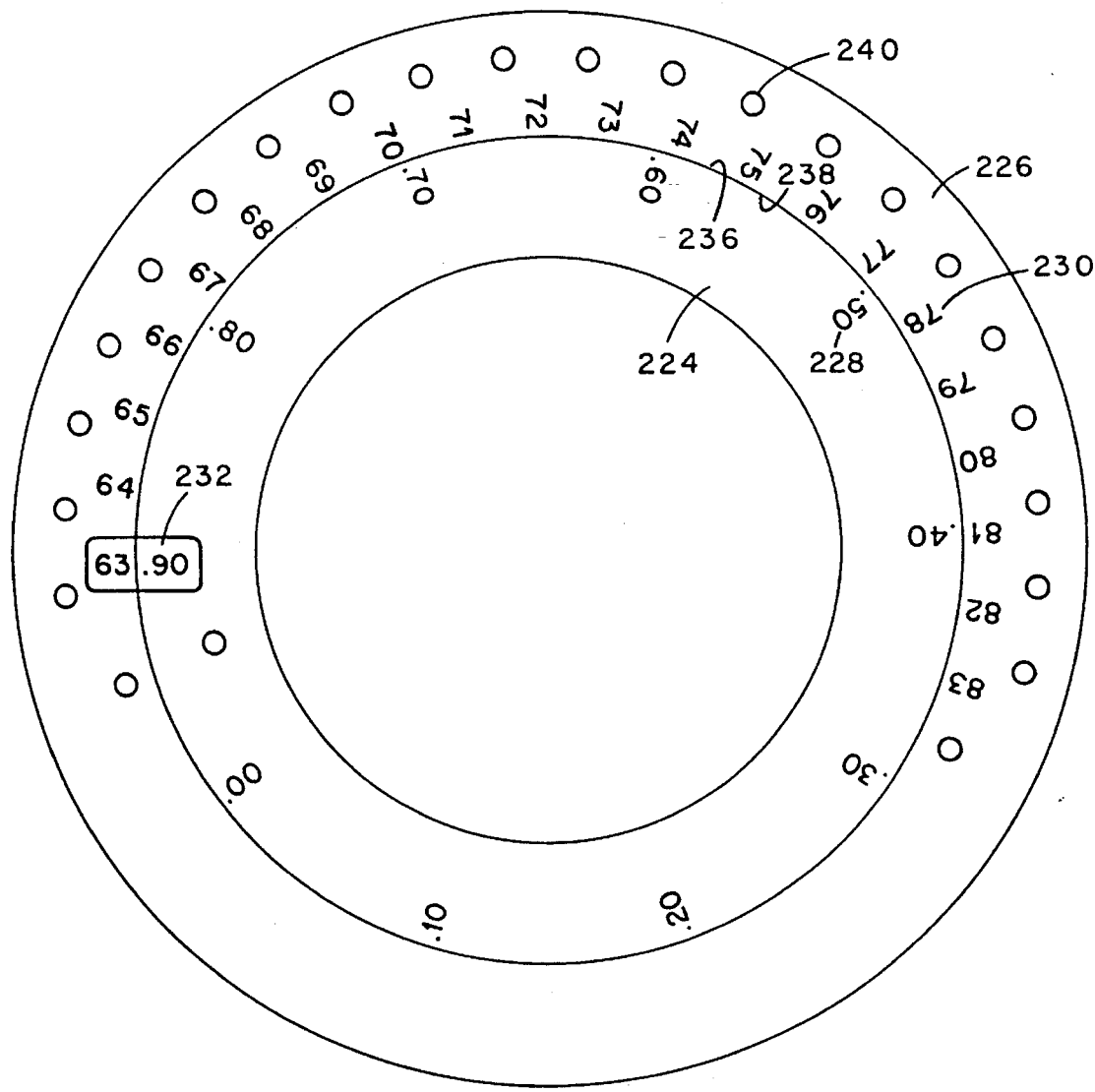
FIG. 14 is a plan view of a set of ring dials as employed in the stop means depicted in FIG. 13.
Figure 33:
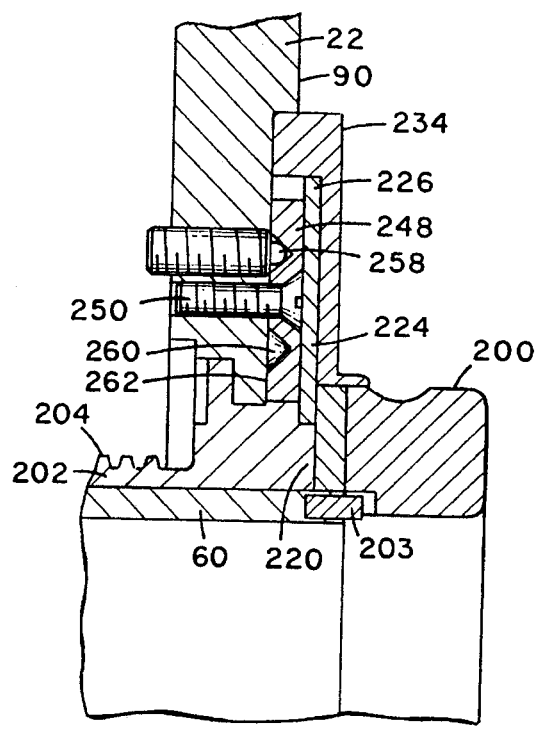

In this embodiment of the stop means, visual indication of the location of the follower nut, hence the maximum permissible extent of radial expansion of the segments, hence the maximum permissible outer circumference of the drum, is provided for by means of a set of flat ring dials 224 and 226 (see FIGS. 23–26). Each dial is provided with indicia 228 and 230 that are visible through a window 232 (see FIG. 15) defined in a circular housing 234 which serves to mount the circular dials 224 and 226, along with other of the components of the stop means, to the outer surface 90 of the end plate 22. With reference to FIG. 33 more specifically, the first of the flat ring dials 224 is positioned flat against the outboard end 220 of the coupler 202 and held in this position, in sliding rotational relationship to the end plate 22, by means of the housing 234. As shown in FIG. 14, the outer circumference 236 of the first ring dial 224 is substantially equal to the inner circumference 238 of the second ring dial 226 so that the first ring dial 224 may be received within the second ring dial 236. As depicted in FIG. 14, 25 and 26, the second ring dial 226 is provided with a series of equally spaced apart pins 240 which project inwardly from the face 246 of the ring dial 226. A like, but single, pin 244 projects inwardly from the face 245 of the first ring dial 224. Referring to FIG. 33 (also FIGS. 27 and 28), a star gear 248 is mounted, as by bolt means 250, to the end plate 22 and is interposed between the outer face 90 of the end plate 22 and the housing 234. This star gear is thus in position to be engaged by the pins 240 and 244 on the first and second ring dials.

Referring to FIG. 13, the adjustment knob 200 is operatively connected to the first, and innermost, ring dial 224 as by means of a friction ring 251 which is disposed between the inner surface 253 of the adjustment knob 200 and the outboard end 220 of the sleeve coupler 202 (see FIGS. 13, 17, 21 and 23). As best seen in FIG. 13, this friction ring also engages the first ring dial 224 so that when pressure is applied to the adjustment knob 200 in a direction inwardly of the drum, the friction ring serves to couple the adjustment knob to the sleeve coupler and also to the first ring dial 224. As noted hereinbelow, this locking pressure is provided by spring means disposed in the adjustment knob. By these means, rotation of the knob 200 results in rotation of the sleeve coupler and of the first ring dial about the longitudinal centerline 52 of the shaft 60. As the first ring dial is rotated, its pin 244 is caused to engage the lobes 250 of the star gear 248 and impart rotation to the star gear. Others of the lobes of the star gear engage the pins of the second ring dial so that the rotation imparted to the star gear by reason of the rotation of the first ring dial results in opposite directional rotation of the second ring dial. In the depicted embodiment, one rotation of the first ring dial represents a one inch change in the maximum change in the circumference of the drum. Thus, the graduations on the first ring dial are in tenths of an inch. By design of the star gear and the spacing of the pins 240 of the second ring dial 226, a single full rotation of the first ring dial results in rotation of the second ring dial by a one-inch increment, so that the graduations on the second ring dial are in inches. Limit pins 254 and 256 provided on the first ring dial set the maximum and minimum limits of the possible circumference settings permissible. Referring to FIG. 33, preferably, the star gear is provided with a resiliently-biased locking pin 258 which engages one of a series of indentations 260 in the inward surface 262 of the star gear to provide a positive indication of the positioning of the star gear when one is changing the settings of the ring dials.

In normal operation of the drum, the adjustment knob 200 is locked against rotation. This is accomplished by means of one or more pins 203 which lock the knob to the shaft 60. Spring means 266 captured within a cavity 268 in the knob and acting through a pin 264 serve to resiliently urge the knob 200 toward the end plate 22 and cause the pins 203 located in the end of the shaft to engage mating openings 270 in the knob and thereby lock the knob against rotation relative to the shaft. By pulling the knob away from the end plate, against the action of the spring 266, the knob is unlocked for rotation and resultant adjustment of the maximum circumference of the drum.

The foregoing detailed description of preferred embodiments is for the purpose of illustration and not limitation. It should be recognized that a belt and tread drum could be made with numerous modification substitutions, deletions and additions without departing from the scope of the claims as set forth hereinafter.

I claim:

1. Apparatus substantially in the form of a drum having an adjustable outer cylindrical circumference for use in the forming of the belt and tread package of a vehicle tire comprising shaft means disposed centrally of said apparatus and defining a longitudinal centerline of said apparatus, said shaft means including a central bore in one end thereof which is adapted to provide for the attachment of said drum to a drive shaft of a tire making machine by reason of said shaft means being received within said central bore, a plurality of radially positionable cam elements disposed in radialy spaced apart location about said shaft means, each of said cam elements having first and second opposite end portions, and at least one substantially flat cam surface with is disposed radially inwardly of said cam element and facing toward said central shaft, first end plate means secured to said shaft means at one end of said shaft means, said first end plate means providing support for said first ends of said plurality of radially positionable cam elements, second end plate means anchored with respect to said shaft means at a location along the length of said shaft means whereby said second end plate means is disposed in fixed spaced apart relationship with said first end plate means, said second end plate means supporting said second ends of said plurality of radially positionable cam elements, cylinder means disposed fully internally of said drum, concentrically of, in longitudinal moveable relationship with, and extending along said shaft means, said cylinder means defining a fluid-tight chamber internally of said drum between said shaft means and said cylinder means, one end of said cylinder means adapted to contact a stop which is associated with said shaft means for limiting the movement of said cylinder means in one direction along said shaft means, a plurality of cam follower means secured to said cylinder means in position to engage the cam surfaces of said cam elements and urge said cam elements radially outward upon the movement of said cylinder in a direction along the longitudinal axis of said shaft means which increases the volume of said fluid-tight chamber toward its maximum volume, stop means associated with said second end plate means and one end of said shaft means and being disposed in the path of movement of said cylinder means to effect a halt to the movement of said cylinder means when said cylinder means contacts said stop means as a result of the movement of said cylinder means in response to expansion of the volume of said fluid-tight chamber, means for urging said cam elements toward a most inwardly radial position with respect to said central shaft means, means associated with said cylinder means for urging said cylinder means toward a position with respect to said shaft means whereby said fluid-tight chamber is of maximum volume and said cam followers are urged into engagement with respective ones of said at least one cam surfaces of said cam elements to position said cam elements radially outwardly of said shaft means, arcuate plate segment means secured to said cam elements at a location radially outward of respective ones of said cam elements, each of said plate segment means being of a geometry which defines a portion of an outer cylindrical circumference of said apparatus, said plurality of said plate segments collectively defining the outer circumferential cylindrical surface of said apparatus.

2. The apparatus of claim 1 wherein said axle means extends through the central portion of said second end plate and is disposed in cantilevered fashion externally of said drum and said stop means comprises an elongated threaded member of known thread pitch associated with that portion of said axle means which extends externally of said drum, micrometer nut means threadably received on said threaded member and in generally encircling relationship to said axle means whereby movement of said nut means along said threaded member positions said nut means along at least a portion of the longitudinal length of said axle means, said nut means being disposed in the path of movement of said cylinder means along said axle means whereby contact of said cylinder means with said nut means halts the movement of said cylinder means in response to any attempted increase in the volume of said fluid chamber.

3. The apparatus of claim 1 and including indicia means associated with said stop means, said indicia means being disposed with respect to said nut means so as to permit the positioning of said nut means at any of a plurality of positions along at least a portion of the longitudinal length of said shaft means, said indicia means being calibrated with respect to the radial position of said plurality of plate segment means whereby the position of said nut means along the length of said shaft means may be chosen to stop the movement of said cylinder means at a location which is representative of the radial position of the plurality of plate segment means hence is representative of the outer circumferential dimension of said drum.

4. The apparatus of claim 1 wherein the cam surface of each of said cam elements is contoured to provide for substantially uniform radial movement of each of said cam elements over at least a major portion of a radial path from a minimum outer circumference position to a maximum outer circumference position.

5. The apparatus of claim 2 wherein said nut means is a micrometer nut.

6. The apparatus of claim 2 and including means for selectively locking said nut means against movement of said nut means along the length of said threaded means.

7. The apparatus of claim 6 wherein said micrometer nut is provided with semi-circular notches in and spaced apart about the outer periphery thereof and said locking means comprises a locking rod of D-shaped cross section and which is disposed for positioning of a portion of said locking rod in one of said notches when said locking rod is rotated about its longitudinal axis to orient the semi-circular portion of its cross-section in engaging alignment with said one of said notches.

8. The apparatus of claim 1 wherein said stop means includes rotatable means threadably mounted for movement in opposite directions parallel with the longitudinal axis of said shaft means and indicia associated therewith which provide a visual indication of the position of said rotatable means, said indicia being calibrated with the outer circumference of said drum to thereby provide a visual indication of the outer circumference of said drum which is associated with the position of said rotatable means, and further including means accessible externally of said drum for altering the position of said rotatable means to select the outer circumference of said drum.

9. The apparatus of claim 1 wherein each of said cam followers comprises roller mounted on the outboard end of a mounting means which is secured to said cylinder whereby each of said cam followers tangentially engages a respective one of said cam surfaces of said cam elements.

10. The apparatus of claim 1 wherein said means for urging said cam elements toward a most inwardly radial position with respect to said central shaft means comprises spring means.

11. The apparatus of claim 1 wherein said cam elements are at all times constrained toward a most radially inward position with respect to said central shaft means and movement of said cam elements in a direction radially outwardly with respect to said central shaft means occurs only when the inwardly directed constraint is overcome by the longitudinal movement of said cylinder along said central shaft means.

* * * * *

UNITED STATES PATENT AND TRADEMARK OFFICE
CERTIFICATE OF CORRECTION

PATENT NO. : 5,618,374
DATED : April 8, 1997
INVENTOR(S) : Mark S. Byerley

It is certified that error appears in the above-indentified patent and that said Letters Patent is hereby corrected as shown below:

Column 13, line 20: "radialy" should read -- radially --.

Column 13, line 23: "with" should read -- which --.

Column 15, line 6, After "comprises" and before "roller", insert -- a --.

Signed and Sealed this

Fourth Day of November, 1997

*Attest:*

BRUCE LEHMAN

*Attesting Officer*   *Commissioner of Patents and Trademarks*